July 25, 1972    I. M. REICH    3,679,416
AGGLOMERATION OF POWDERED COFFEE
Filed Dec. 2, 1970    2 Sheets-Sheet 2

United States Patent Office 3,679,416
Patented July 25, 1972

3,679,416
AGGLOMERATION OF POWDERED COFFEE
Ismar M. Reich, Merrick, N.Y., assignor to Chock Full O'Nuts Corporation, New York, N.Y.
Filed Dec. 2, 1970, Ser. No. 94,462
Int. Cl. A23f 1/04
U.S. Cl. 99—71                                                    6 Claims

ABSTRACT OF THE DISCLOSURE

A means and method for modifying instant coffee by agglomeration to form particles of controlled increased size, darkened appearance, and controlled bulk density. A falling stream of instant coffee is sprayed with an aqueous fluid and is allowed to drop onto a moving layer of dry instant coffee. The combined moistened and dry coffee is dried at low temperature. Agglomerated particles are removed by screening and the undersize particles are recycled. Regulation of the moving layer velocity controls agglomerate particle size. Adjustment of other parameters controls bulk density.

---

Figure 1:
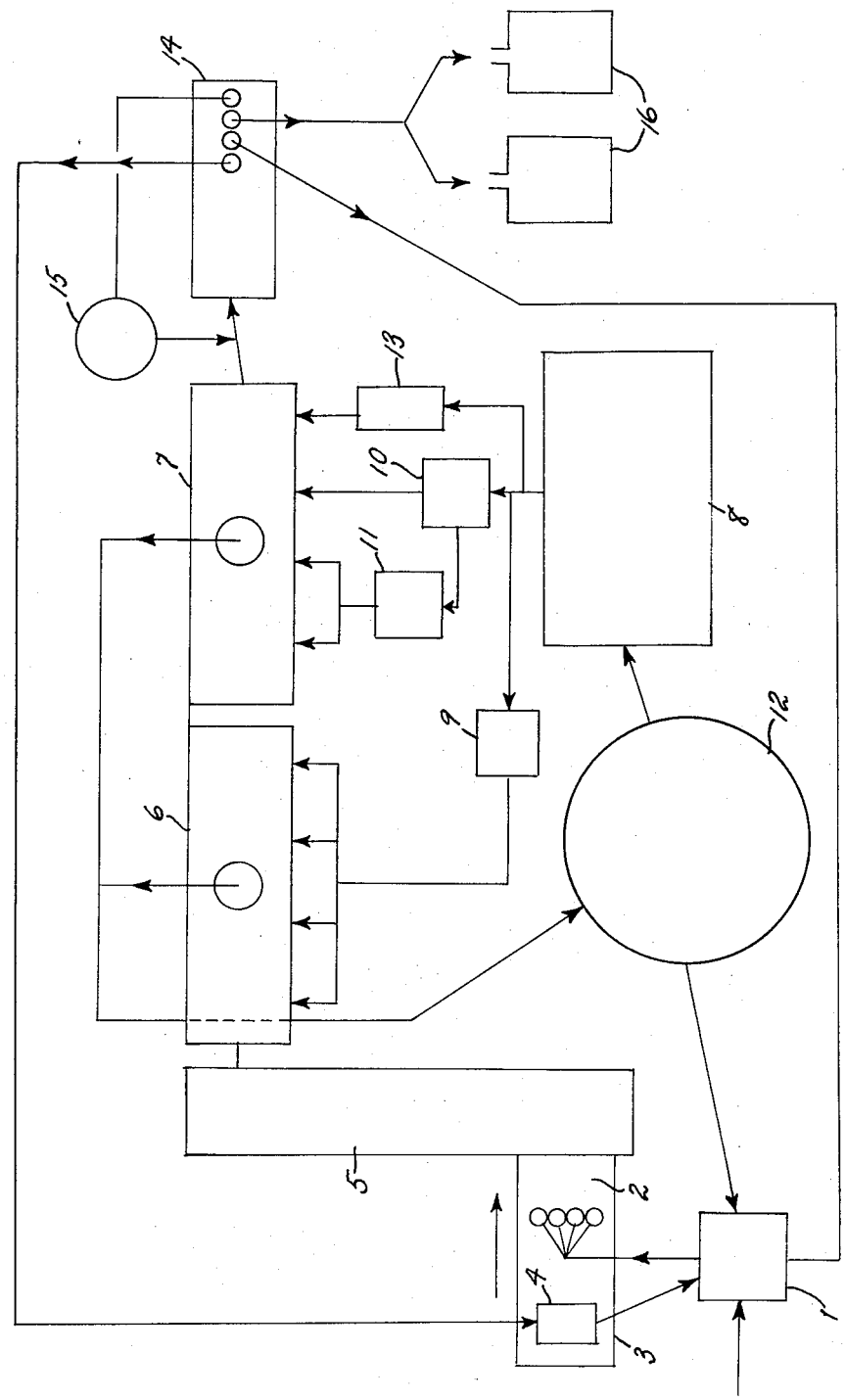

This invention relates to a process for manufacturing an improved instant coffee, and more particularly to an improved method of agglomerating instant coffee.

Instant coffee is the dehydrated aqueous extract of roasted coffee. Substantial improvements have been made in the quality of the product over the past half century resulting from improved control of the various steps in extraction and drying. However, many desirable characteristics have not heretofore been achieved.

Relatively recently some attention has been given to physical improvements in instant coffee by means of agglomeration techniques. Agglomeration, or "instantizing," has been widely applied to dried milk products and sugar products since the 1930's. However, these prior art processes have not generally been applicable to instant coffee because of its nature and because of the peculiar characteristics which are required in the finished product.

Agglomeration consists essentially of forming large clusters of relatively small particles by causing small particles to stick to one another, the clusters having different physical characteristics from the individual smaller particles. In general the agglomerates have more rapid dissolving or dispersing characteristics on contact with water. Increased flowability of the dry agglomerates and the absence of dustiness are also generally advantageous.

In the case of instant coffee there are additional requirements which an acceptable product must meet. Commercial instant coffees have established a demand for a relatively low bulk density such that the consumer can brew a cup of coffee using a more or less rounded teaspoonful of product. An agglomerated product should maintain this low bulk density. This also means that existing established instant coffee jars should be useable for an agglomerated product.

An acceptable agglomerated instant coffee product must also have sufficient structural strength to withstand the rigors of high speed packaging and handling both before and after packaging. Both the low bulk density referred to above and the relatively large particle size considered attractive are factors which inherently tend to result in a structurally weak agglomerate. A weak product initially of satisfactory density and particle size will fracture when handled producing smaller particles and an increased bulk density.

Furthermore, the flavor of instant coffee is heat sensitive. Therefore, to avoid damage to flavor the agglomeration process must not expose the instant coffee to elevated temperatures such as would occur, for example, by treatment of instant coffee with steam.

Prior attempts to agglomerate instant coffee have failed to meet all the requirements of large particle size, low bulk density, adequate structural strength and avoidance of damaging heat treatment.

It is accordingly among the principal objects of the present invention to provide an improved means and method for agglomeration of instant coffee to make a structurally strong, low bulk density product comprising large, attractive appearing particles, without subjecting the instant coffee to damaging heat treatment.

An objection to typical instant coffee is that it has a pale tan color and fine or even dusty appearance which is quite unlike ground roasted coffee which the consumer is familiar.

Another object of the invention is therefore to provide an instant coffee having a dark, coarse, granular appearance, at least as dark and at least as coarse as typical ground roasted coffee.

Another object is to provide an agglomerated instant coffee of improved flavor and aroma as compared to the instant coffee used to form the agglomerated product.

Yet another object of the invention lies in the provision of an improved agglomeration process in which the particle size may be conveniently varied.

A further object is the provision of an improved agglomeration process in which the product bulk density can be varied.

A still further object of the invention lies in the provision of an improved coffee agglomeration process which is substantially continuous in operation and in which agglomerated particles smaller than a predetermined size and any unagglomerated coffee are continuously recycled for further agglomeration.

A feature of the disclosed embodiment lies in the fact that the process may be used for agglomerating many particulate materials other than coffee with relatively minor modification.

These objects and features, as well as other incidental ends and advantages, will more fully appear in the progress of the following disclosure and be pointed out in the appended claims.

BRIEF STATEMENT OF THE INVENTION

The invention consists essentially in providing a controlled rate of supply of instant coffee, hereinafter called "feed," allowing this feed to fall freely, simultaneously exposing the falling feed to an atomised spray of a liquid comprising water or a coffee extract or solution at a controlled rate, thereby causing moistening of the falling feed, providing a continuously moving layer of dry instant coffee, hereinafter called "bed," beneath the falling moistened feed, and allowing the moistened to fall on the dry moving bed and to join its movement. Agglomerated particles are formed by contact of moistened feed particles with one another and by contact with the moving bed. The contact of the moistened particles with the dry bed provides an immediate partial drying of the moist particles. The combined moistened and relatively dry materials are then subject to further drying by exposure to dry heated air, followed by a screening step to remove the large particles as agglomerate product and return the finer particles to be used again as bed.

In the drawing, FIG. 1 is block diagram of an embodiment of the invention.

Figure 2:
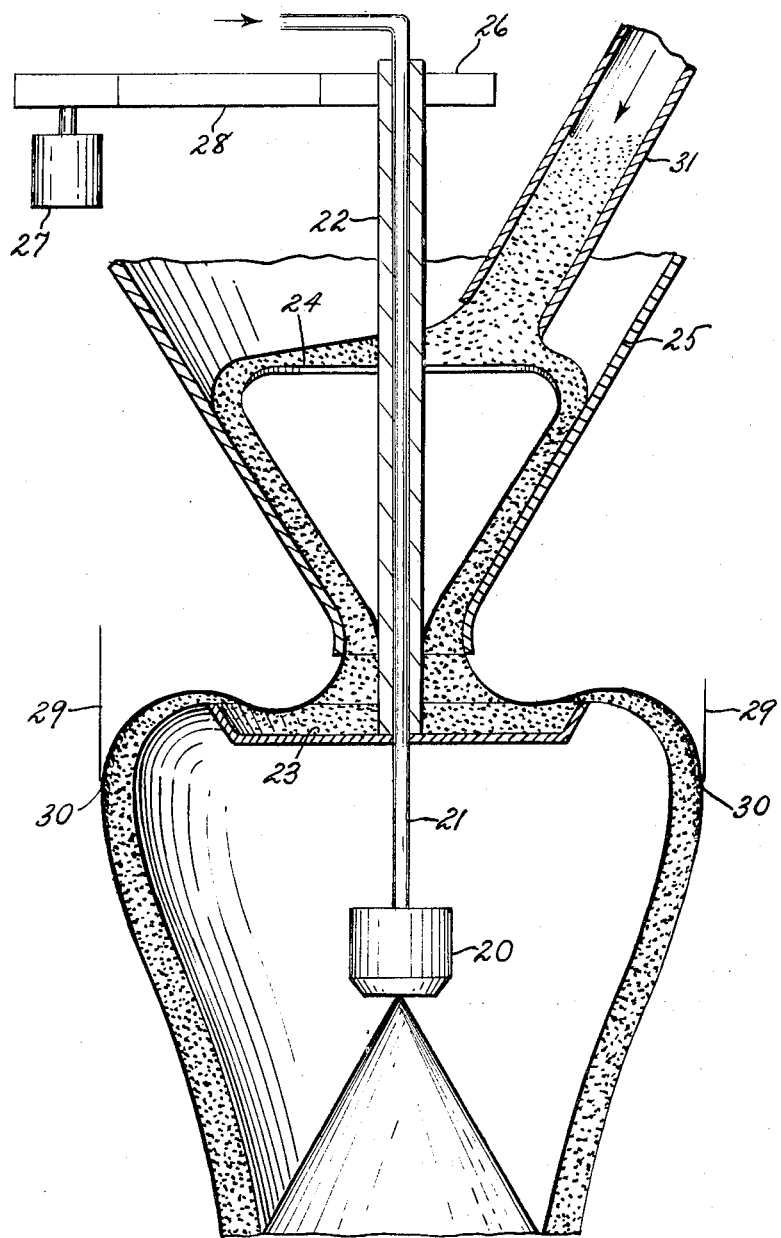

FIG. 2 is a schematic view showing details of a feed distributing and spray nozzle device forming a part of the embodiment.

DESCRIPTION OF PROCESS

The use of a moving layer of dry bed confers many unique advantages on the process. First, the immediate rapid partial drying permits the use of a higher ratio of liquid to feed powder than would otherwise be practical. Second, the bed prevents adhesion of the moist material to supporting structures and provides a mixture which can easily be handled in conveying equipment without fouling the equipment. Third, a very valuable advantage is that control of the rate of movement of the bed controls the particle size of the agglomerates formed, i.e. the faster the rate of bed movement, the smaller the particles size.

It has been found that, in general, the greater the ratio of liquid to feed employed, the darker is the color of agglomerates formed and the structurally stronger are the agglomerates.

However, in the high range of moisture to feed ratios employed in this process it is important to rapidly dry the moist coffee at least partially; otherwise the initially highly porous structure of the freshly formed agglomerates would collapse under the influence of gravity and probably also under the influence of surface tension, the amount of moisture initially present being sufficient to almost completely dissolve the feed given sufficient time. Fourth, the use of dry moving bed prevents formation of oversize agglomerates which could otherwise clog conveyors, dryers and sifters.

Fifth, the presence of bed along with the agglomerate appears to cushion the agglomerate and prevent breakage of the large particles in drying and conveying equipment.

Sixth, the presence of the bed together with the coarse agglomerate facilitates completion of drying.

This probably results because there is much more total surface available for contact with the drying air when agglomerate is dried in the presence of bed. No doubt there is continuing transfer of moisture from moist agglomerate particles to bed by direct contact during drying.

Furthermore, in a fluid bed type of dryer, which is a preferred type of dryer for agglomerate, the presence of fine material facilitates fluidization of the entire charge to the dyer. This expedites drying and provides for uniform treatment of the agglomerate particles, thereby permitting drying to take place rapidly and at relatively low temperatures.

Seventh, contact of the moist feed with bed results in the formation of additional agglomerate by virtue of the fact that some of the bed adheres to the moist agglomerate. It might seem that this would alter the character of the agglomerates formed since the bed-derived portion of the agglomerates would not have been subjected to the intense moistening to which the feed is subjected. However, this is true only during a brief period of initial start-up of the process. After that point, the bed layer consists almost entirely of agglomerate, differing from the finished product only in that it is agglomerate of a finer particle size range. The process being continuous, all agglomerate particles which either initially were too small to be retained as finished product or resulted from the inevitable fractures or attrition of agglomerate in handling and drying are recycled as bed. Consequently when these fine aggomerate particles adhere to fresh moist agglomerate the resulting increased agglomerate partciles are essentially homogenous in character.

The color of instant coffee substance is inherently a very dark brown. However, it is translucent and thin films or small particles of instant coffee appear to be light tan because of reflection and scattering of light from the many internal and external surfaces of the product. When an instant coffee is pulverized, its color always appears lighter than before pulverization because of this effect of increased surface area reflecting more light.

In the disclosed process a dark color results from the formation of a relatively thick walled product. Although there is a sufficient volume of pores within the particles to maintain a low bulk density, the pores are relatively large and few in number and consequently there is less surface area available to reflect light. Microscopic examination of the product of this invention shows almost a complete absence of the fine dusty particles present in the feed. Apparently the fine particles in the feed are dissolved in the intense wetting action where the liquid spray contacts the feed.

It has been found that the process operates satisfactorily within a range of about 11% to about 21% total moisture based on the feed and liquid spray and before contact is made with the bed. These figures include the moisture, usually 2 to 3%, present in the feed entering the process. Within the stated range, the higher levels of moisture tend to produce darker and structurally stronger but more dense agglomerates.

Thus control of the liquid to feed ratio affords a means for control of agglomerate bulk density.

The bulk density of the agglomerate is also affected by the bulk density of the feed used in its production. In general fine powders tend to have higher bulk densities than, for example, commercial coarse "beady" spray dried coffee. Some increase of density can thus be effected by grinding part or all the feed instant coffee. However, since a relatively low bulk density agglomerated product is generally desired, it is usually undesirable to grind the feed instant coffee. In contrast to some prior art agglomeration processes which require either pulverized or otherwise specially manufactured fine particle feed the disclosed process can be used to agglomerate coarse or fine feed material.

Another factor which influences bulk density is the uniformity of contact of the liquid and the feed. If the contact is not uniform, part of the feed may become excessively moist and the bulk density of the agglomerate will be increased. A suitable means for attaining uniform contact will be described in an example to follow.

Most of the evaluations of the process have been carried out using spray dried feed. However, tests with freeze dried feed indicate that it can also be satisfactorily agglomerated by the method of this invention.

The bed layer is moved at high speed under the zone where the liquid contacts the feed. The bed may be suitably conveyed on a horizontal belt although satisfactory results have also been obtained using an inclined vibrating tray. The bed velocity is maintained at a controlled rate. The faster the bed velocity the smaller the particle size of agglomerates produced. Thus too high a speed will result in a reduced output of particles of the desired predetermined size. Too low a speed may produce agglomerates too large to handle in ordinary conveying equipment. Oversize dried agglomerate particles can be broken up to yield acceptable agglomerate product. However, this breaking step produces a considerable amount of fine material. It is therefore more efficient to control the agglomerate size by adjusting bed velocity to an optimum point where only a small proportion of oversize agglomerate is formed. Thus, the optimum bed velocity will depend on the agglomerate particle size range required.

The high speed of the moving bed layer and the change of direction of the moist feed falling on the bed results in some tumbling and rolling of the moist material. This serves to increase the contact between the moist feed and the dry bed.

The moisture content of the bed should be below 3% and preferably below 2.4% moisture. Tests indicate the process works well with bed moistures down to at least 0.8%. However, moistures below this level are difficult to attain without damage to the quality of the bed material. When the bed moisture is too high there is a tendency for the density of the agglomerates formed to increase.

The amount of bed used can be varied independently of the velocity of the bed layer by adjusting the thickness of the layer. The process operates satisfactorily with the rate of bed supply within a range of about 3 to 12 or more pounds per pound of feed used. The rate required depends to a degree on the moisture content of the bed, i.e. a lower bed rate can be utilized if its moisture is lowered. Too low a bed rate results in failure of the bed to function properly in that the agglomerate particles are not dried as rapidly, the bulk density of the agglomerates tends to increase, and there may be some sticking to conveying equipment and clogging with oversize lumps. Very high bed rates do not interfere with the agglomerating process but necessitate larger conveying, drying and sifting equipment.

The subject process functions well at ordinary room temperatures. It is not necessary to pre-cool the feed as in some prior art. The liquid temperature has little effect on the process except that if heated liquid is used it may be necessary to increase the liquid rate slightly to compensate for evaporation at the spray and maintain the same ratio of moisture applied to the feed. The bed is also suitably used at room temperature but it functions satisfactorily up to about 140° F., above which there is a tendency to increase the density of agglomerates formed.

The moisture content of the finished agglomerated product is suitably in the range of about 2.5% to about 4%. The agglomerate particles can be dried to these levels solely by prolonged contact with dry bed. However, it has been found more practical to expedite the drying by exposing the combined agglomerate and bed to dry heated air, simultaneously drying the agglomerate and the bed. The required final moisture for dried bed is lower than the required finished moisture for agglomerate. It has been found however to be quite feasible to dry each component to its required moisture level. Drying is faster for smaller than for larger particles because the smaller particles have a relatively greater surface area and also a shorter distance from the interior to the surface of the particle. Furthermore, when drying is carried out soon after agglomerate formation, the initial agglomerate moisture level at the dryer entrance is higher than that of the bed. Increased residence time in the drying equipment brings the bed and agglomerate moisture levels closer together and reduced residence time keeps the moisture level of the bed further below that of the agglomerate. Short residence times are also advantageous in minimizing the size of equipment required.

The temperature to which the agglomerate is exposed during drying must be limited, especially in the early stages when its moisture content is relatively high, to prevent an increase in bulk density. Low drying temperatures also avoid damage to the flavor of the instant coffee. At the start of the drying the agglomerate temperature should not exceed about 120° F. and at the end of drying it should preferably not exceed 150° F. Dependent on ambient humidity it may be necessary to dehumidify the air to be used for drying because of the hygroscopic nature of instant coffee and the temperature limits stated. For example, drying air having a dew point of about 50° F. or lower is required to dry agglomerate and bed to moisture levels of 3.5% and 2.2% respectively in a drying time of about 10 minutes.

One type of dryer suitable to be used in the process of this invention is a vibrating fluid bed dryer. The agglomerate can be dried with very little damage from attrition, drying rates are rapid, and air supply temperatures well above the maximum allowable product temperature can be used. The product is conveyed horizontally in a perforated vibrating trough while drying air is passed upward through the trough perforations and contacts the product while passing upward through it. Fine dusty particles derived from any unagglomerated feed as well as dust produced by attrition in conveying and drying pass off with the air leaving the dryer. This dust may be recovered by filtration of the air. In the subject process this recovered dust is suitably returned to the feed stream entering the agglomeration process.

The use of a high quality coffee extract or an aqueous coffee distillate in place of water as the agglomeration liquid can improve the flavor quality of the agglomerate as compared to the instant coffee used as the feed. The high proportion of moisture used as well as the mild (low temperature and rapid) drying employed permits a greater flavor quality improvement than in prior art agglomeration processes. The use of such solutions in place of water as the agglomerating fluid is carried out without apparent physical effect on the process or agglomerated product.

Example 1

By way of example in one particular instance the process was operated as follows. FIG. 1 shows the general arrangement of equipment. FIG. 2 shows details of a feed distributing and spray nozzle device used to provide uniform contact of feed and liquid.

Referring to FIG. 1, spray dried instant coffee was supplied to the feed hopper 1. From this hopper the feed was conveyed at a controlled rate by means of a conventional gravimetric feeder not shown to four distribution devices 2, of the design shown in FIG. 2. The four devices were located above a horizontal belt conveyor 3, 60" wide on a line perpendicular to the direction of movement of the belt which is shown by the arrow.

A bed hopper 4, was located on the belt so as to provide a layer of bed on the belt before it passed under the feed distributors. An adjustable gate such as is commonly used on belt feeders was attached to the bed hopper and was used to regulate the depth of the bed layer and thereby the rate of feed of bed.

From the end of belt 3 the combined stream of bed and moist agglomerate dropped to a second belt 5, moving in a direction perpendicular to the first belt and inclined so as to elevate the bed and the agglomerate to enter the first dryer 6 conveniently. To complete drying and to cool the product, dryer 6 discharged to dryer 7. Dryers 6 and 7 were of the same design, each consisting of a tray 5 feet wide and 19 feet long made of stainless steel. The bottom of each tray contained slits extending the entire length of the tray. The slits were about .004 inch wide and spaced about 1/16 inch from one another for the entire width of the tray. The trays were supported in a structure providing for vibration suitable to convey the tray contents forward while simultaneously air of controlled temperature and humidity was passed upward through the slits and thus passed through the bed and the agglomerate in the dryers.

Dehumidified heated air was supplied to the dryers from a conventional dehumidifier 8, equipped with granular alumina desiccant. Streams of dry air passed through steam heaters 9 and 10, and electric heater 11. Air leaving both dryers was conducted to a dust collector 12, where entrained fine particle coffee was filtered from the air. The filtered air was then returned to the inlet of the dehumidifier. The fine particle coffee filtered from the air was conveyed back to the feed hopper 1. Moisture removed from the air passing through the dehumidifier was continuously exhausted to atmosphere in a separate stream of heated air used to reactivate desiccant exhausted by absorption of moisture. Sections of the dehumidifier were automatically removed from service, reactivated, and returned to service.

Each dryer had four air inlets spaced along the length of the dryer, communicating with an air plenum chamber beneath the dryer trays. Heated air from heater 9 was supplied to all four outlets on dryer 6. Air heated by passage through heaters 10 and 11 went to the first two inlets of dryer 7. Air to the third inlet was taken only from heater 10. The fourth inlet to dryer 7 was supplied with cooled air from cooler 13.

From dryer 7 the agglomerate and bed, now dried, was sent to a sifter 14 equipped with three superimposed screens of stainless steel wire mesh. The top screen had openings of .168 inch, the middle one .0535 inch and the lowest one .0466 inch.

Agglomerate retained by the top screen was sent to a lump breaker 15 which broke the oversize agglomerate and returned it to the inlet of the sifter. The material retained by the middle screen was discharged as finished agglomerate product and put in storage in aluminum bins 16, pending final packaging. The material retained by the lowest screen, designated "recycle," comprising agglomerates only slightly smaller than the desired product size, was conveyed back to the feed hopper 1. The material passing through the lowest screen was conveyed to the bed hopper 4.

An overflow arrangement was provided on the bed hopper so that if the rate of bed being supplied to the bed hopper exceeded the rate of bed being withdrawn from the hopper, the excess was conveyed to the feed hopper 1.

As has been mentioned, FIG. 2 is a cross-sectional view of the feed distributor and nozzle holder used in this example. A single fluid type spray nozzle 20 was attached to the bottom of a vertical fixed pipe 21, the upper end of which was connected to a source of liquid under pressure. Around the pipe was located a hollow sleeve 22 to the bottom of which was affixed a round cup-like tray 23 and near its upper end a disc shaped baffle 24 was attached. A funnel 25 was secured concentric with the vertical pipe. The bottom opening of the funnel was 1¾" diameter and the funnel bottom was located about an inch above the tray 23. The sleeve 22 was provided with bearings, not shown, which allowed it to turn freely around the pipe. At the top of the sleeve a sprocket 26 was attached and the sleeve was rotated by means of motor 27 and chain 28. The rotation of the sleeve caused tray 23 and baffle 24 to rotate.

Surrounding tray 23 was secured a stationary concentric cylindrical baffle 29, 6" in diameter, the lower edge of which was bent inward to form a lip 30 about 1/16" wide.

Feed was supplied at a controlled rate through pipe 31 and directed toward rotating baffle 24. After leaving baffle 24 the feed was guided uniformly to the center of rotating tray 23 by funnel 25. Leaving tray 23 the feed was confined by baffle 29 and allowed to fall freely to the spray area. The rotating disc baffle 24, the funnel 25, and the rotating tray 23 served to provide a uniform powder distribution independent of possible changes in the controlled rate of supply of feed. The vertical baffle 29 and lip 30 prevented projection of the feed away from the liquid spray area. The nozzle 20 sprayed the liquid to form a hollow vertical cone at an angle of about 65°. In this example the feed falling freely about the spray nozzle was drawn in slightly toward the spray by the action of the spray as shown in FIG. 2.

The rate of feed in this example was 29.7 lbs. per minute comprising 17.1 lbs. per minute of spray dried instant coffee, 8.7 lbs. per minute of recycle agglomerate, 3.4 lbs. per minute of instant coffee dust separated from the air leaving the dryers and 0.5 lb. per minute of excess bed overflow. The spray dried instant coffee had a tamped bulk density of 15.2 lbs. per cubic foot, a moisture content of 2.9% by weight, and a particle size analysis as follows:

| Percent by weight retained: | U.S. sieve No. |
|---|---|
| 0.5 | 20 |
| 7.7 | 30 |
| 47.4 | 50 |
| 27.8 | 80 |
| 7.4 | 100 |

The instant coffee dust had a tamped bulk density of 31.2 lbs. per cubic foot and a particle size analysis as follows:

| Percent by weight retained: | U.S. Sieve No. |
|---|---|
| 9.7 | 100 |
| 88.0 | 170 |
| 1.2 | 200 |

The bed had a tamped bulk density of 22.3 lbs. per cubic foot and a particle size analysis as follows:

| Percent by weight retained: | U.S. Sieve No. |
|---|---|
| 3.7 | 20 |
| 34.1 | 30 |
| 46.7 | 50 |
| 9.7 | 80 |
| 1.7 | 100 |

The tamped bulk density of the recycle stream was 17.4 lbs. per cubic foot.

The feed stream was divided equally among the four distribution devices, each of which received about 7.4 lbs. per minute.

The spray nozzles were supplied with water at 260 lbs. per square inch pressure at a total rate of 3.9 lbs. per minute.

The rate of supply of bed was 195 lbs. per minute. The velocity of the horizontal conveyor belt 3 in FIG. 1, was 5.75 feet per second.

The dryers were supplied with a total of approximately 7,600 cubic feet of air at a 22° F. dew point. The superficial vertical air velocity in the dryers was 40 feet per minute. The total residence time in the dryers was approximately seven minutes. The air temperatures entering the first dryer 6 in FIG. 1, was 185° F.; entering the first two sections of the second dryer 7 in FIG. 1, 165° F.; entering the third section 135° F. Entering the last section of dryer 7 the temperature was 70° F.

In passing through the dryers, the bed and agglomerate were gradually warmed from 90° F. near the entrance of the first dryer to a maximum of about 140° F. in the second dryer followed by cooling to about 100° F. at the discharge of the second dryer.

The finished agglomerate had a tamped bulk density of 14.5 lbs. per cubic foot, a moisture content of 3.6% by weight and a particle size analysis as follows:

| Percent by weight retained: | U.S. Sieve No. |
|---|---|
| 0.2 | 5 |
| 30.0 | 10 |
| 48.7 | 16 |
| 7.7 | 20 |

The rate of agglomerate output was 17.2 lbs. per minute.

The agglomerated product had an attractive dark granular appearance. The flavor of the agglomerated product compared favorably to the spray dried instant coffee used in the process.

Example 2

In this example the same equipment and conditions were employed as in Example 1 with the exception of the velocity of the horizontal conveyor belt 3 in FIG. 1, which was decreased from 5.75 feet per second to 5.33 feet per second. The agglomerated product was essentially the same in all respects except particle size. The particle size analysis was as follows:

| Percent by weight retained: | U.S. Sieve No. |
|---|---|
| 1.0 | 5 |
| 42.7 | 10 |
| 42.6 | 16 |
| 5.4 | 20 |

Measurements made on the agglomerate prior to entry to the sifter 14 in FIG. 1, also indicated that the average particle size had increased as a result of decreasing the speed of the conveyor belt. The rate of oversize agglomerate retained by the top screen in the sifter and conveyed to the lump breaker also had increased.

The relationship between bed velocity and particle size is effective over a range of velocities. This affords wide flexibility in the selection of a particle size range which may be considered desirable for a particular product application.

There are, however, practical limitations on bed velocity and particle size. When the bed velocity was reduced to about 4 feet per second with the feed rate and other conditions as in Example 1 the agglomerated particles became so large that they became difficult to convey to and from the dryers and clogged the equipment. Furthermore the rate of drying was slower for the very large particles, requiring longer residence time in the drying equipment.

At bed velocities of about 8 feet per second, with other conditions as in Example 1, the particles were relatively small and there appeared to be no advantage in exceeding that velocity.

Thus, under the given conditions, of Example 1, the practical range of bed velocities lies between about 4 and about 8 feet per second. However, under other circumstances a wider range may be needed. For example, with a feed rate of 3.1 lbs. per minute to a distribution device (FIG. 2) instead of the 7.4 lbs. per minute feed employed in Example 1, and a water spray rate of 0.55 lbs. per minute instead of 0.98 lbs. per minute as in Example 1, a bed velocity of 3 feet per second was employed with satisfactory results and the agglomerates formed were handled easily. The control of particle size by adjustment of bed velocity functioned the same in this case as in Examples 1 and 2.

Although particles of the size ranges given in Examples 1 and 2 are considered attractive, a particle size range which would be desirable in every case cannot as a practical matter be specified, nor can an optimum particle size be specified. The selection of an attractive particle size is a matter of aesthetic preference. Furthermore, different particle size ranges may be desirable for different markets. For example, a relatively smaller sized agglomerated instant coffee would be desirable for use in automatic vending machines where the properties of good flowability, rapid dissolving, and lack of dustiness are most important but where large particles can plug the delivery spouts in the machines.

Although the same mesh sifter screens were used in Examples 1 and 2, it will be obvious that to effect a large change in particle size of the agglomerated product would require, in addition to a change in bed speed, an appropriate change of the screens used in the sifter to define the particle size range to be accepted. It will also be apparent that the uniformity of agglomerate particle size accepted will be influenced by the closeness in opening size of the screens used to reject oversize and undersize particles.

Example 3

In this example the same equipment and conditions were employed as in Example 1, with the exception of the feed rate which was increased from 29.7 lbs. per minute to 31.6 lbs. per minute. The agglomerated product was essentially the same except that the tamped bulk density decreased from 14.5 lbs. per cubic foot to 13.2 lbs. per cubic foot.

I wish it to be understood that I do not consider the invention limited to the precise details of structure shown and set forth in this specification and in the examples for obvious modifications will occur to those skilled in the art to which the invention pertains.

I claim:

1. The process of agglomerating instant coffee to form agglomerated particles of controlled size larger than the instant coffee fed to the process, comprising the steps of: forming a stream of freely falling instant coffee particles; exposing said stream to contact with an atomized spray of an aqueous liquid to give a moistened falling adherent coffee stream; providing a continuously moving layer of dry instant coffee upon a supporting structure beneath the said falling moistened stream; allowing the said moistened instant coffee stream to fall onto said dry moving layer; forming agglomerated particles by contact of moistened particles with one another and by contact with said dry moving layer; said contacting with said dry layer providing an immediate partial drying of said moist instant coffee; the dry layer preventing adhesion of the moist material to said supporting structure and providing a mixture which can be easily handled in conveying equipment; controlling the rate of movement of said moving layer through the zone where the moist instant coffee falls thereupon to join it, thereby controlling the size of agglomerates formed; providing means for further drying of the agglomerates formed by exposing the layer leaving said zone to contact with dry heated air.

2. The method in accordance with claim 1 in which the particle size of the agglomerates formed is controlled by setting the rate of movement of the moving layer of bed within the range of about three feet per second and about eight feet per second.

3. The method in accordance with claim 1 in which the bulk density of the agglomerated product is controlled by setting the ratio of the rate of liquid sprayed to the instant coffee feed rate such that the total moisture of the instant coffee feed and the liquid sprayed is within the range of about 11% to about 21% before contact with the bed.

4. The method in accordance with claim 1 in which the moisture content of the moving bed layer is maintained within the range of 0.8% and 2.4%.

5. The method in accordance with claim 1 in which drying of the agglomerate is carried out at temperatures below 150 degrees Fahrenheit.

6. The method in accordance with claim 1, including the step of mixing agglomerated particles of desired size with particles of lesser size to stabilize density.

References Cited

UNITED STATES PATENTS

| | | | |
|---|---|---|---|
| 3,143,428 | 8/1964 | Reimers et al. | 99—164 |
| 3,446,218 | 5/1969 | Stirling | 23—313 X |

FRANK W. LUTTER, Primary Examiner

W. L. MENTLIK, Assistant Examiner

U.S. Cl. X.R.

23—313; 99—199, DIG 4; 264—117